Nov. 1, 1949.  E. S. SMITH  2,486,443
APPARATUS FOR AUTOMATICALLY CONTROLLING TEMPERATURES
Filed July 23, 1946  4 Sheets-Sheet 2
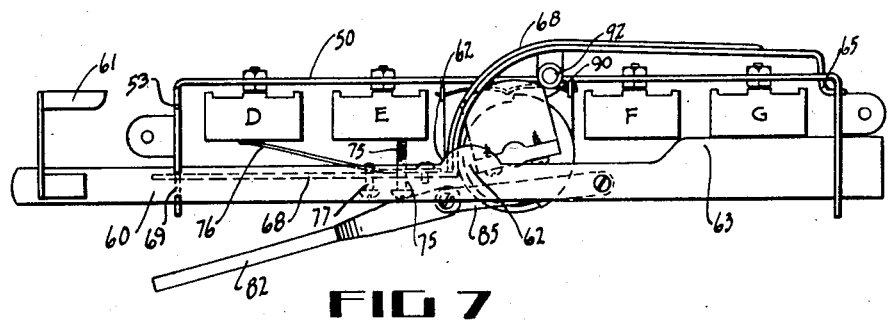
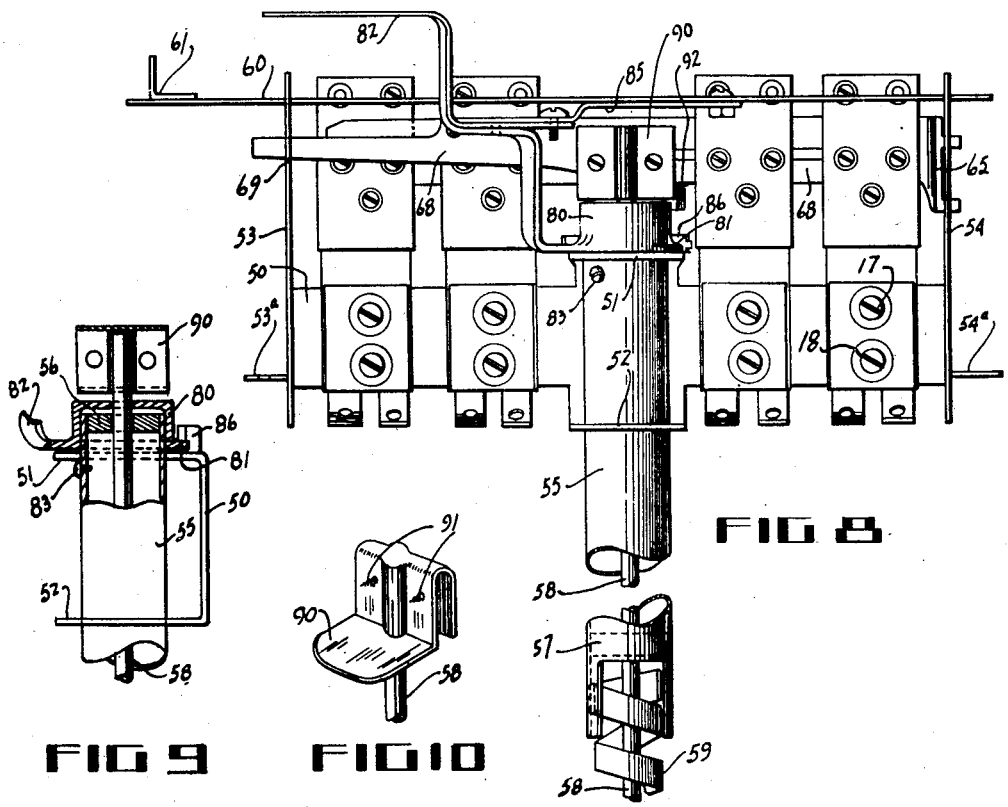
ELMORE S. SMITH
INVENTOR
Attorney Nov 1, 1949.  E. S. SMITH  2,486,443
APPARATUS FOR AUTOMATICALLY CONTROLLING TEMPERATURES
Filed July 23, 1946  4 Sheets-Sheet 3

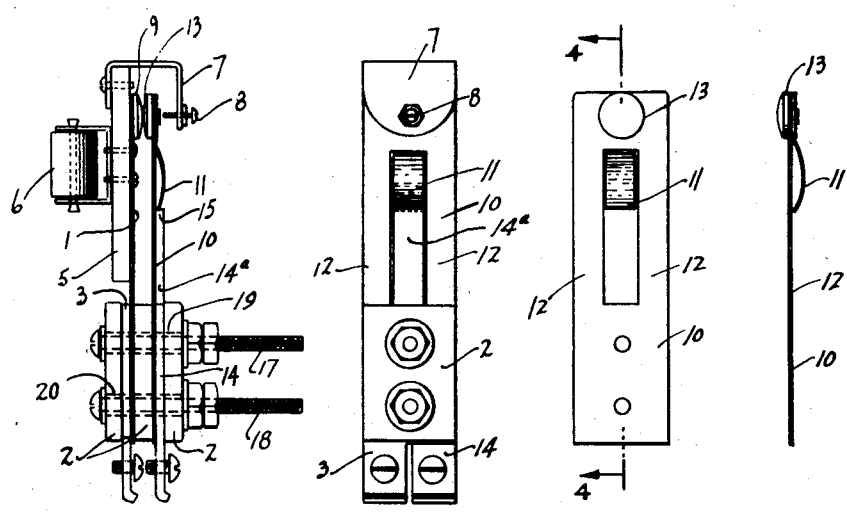
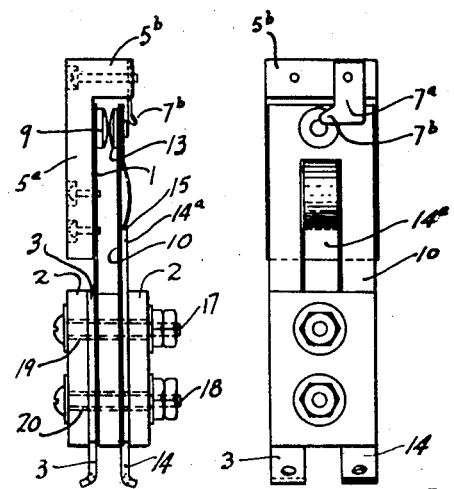

ELMORE S. SMITH
INVENTOR.
Attorney.

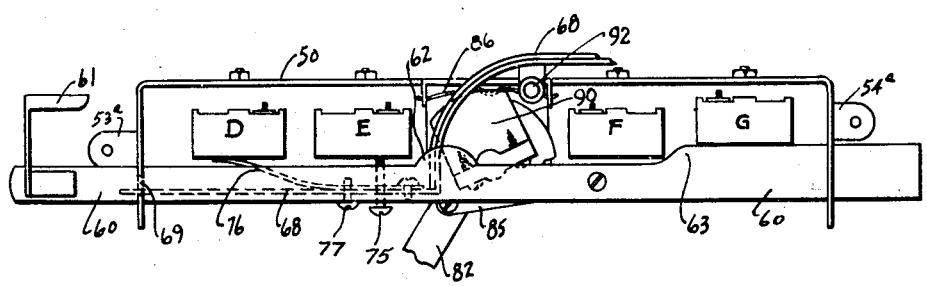
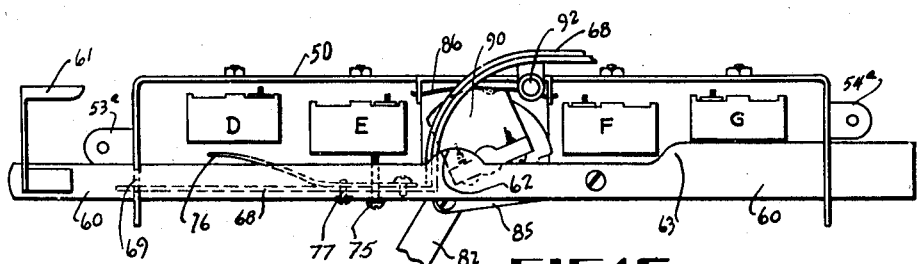
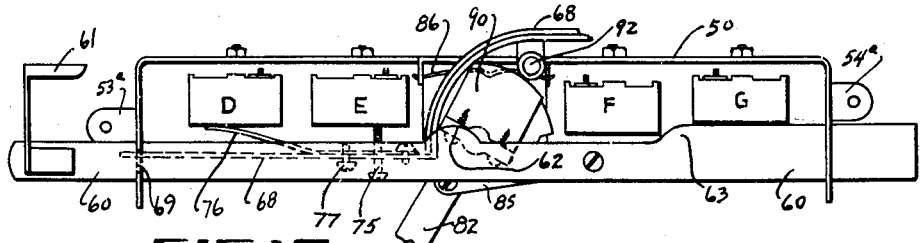
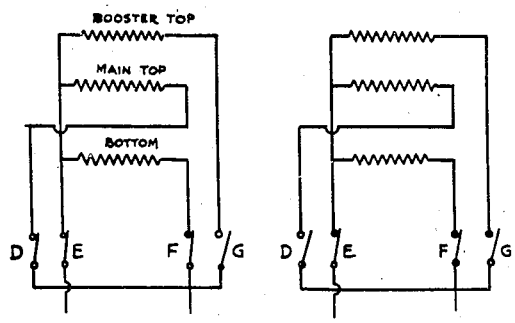
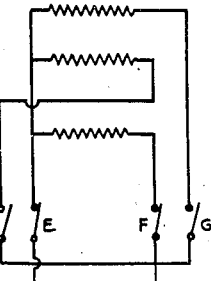
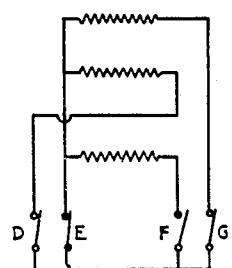

Patented Nov. 1, 1949

2,486,443

UNITED STATES PATENT OFFICE 2,486,443

APPARATUS FOR AUTOMATICALLY
CONTROLLING TEMPERATURES

Elmore Stanley Smith, Weston, Ontario, Canada,
assignor to Moffats Limited, Weston, Ontario,
Canada, a corporation Application July 23, 1946, Serial No. 685,626

8 Claims. (Cl. 200—139)

The present application is a continuation-in-part of my prior application Serial No. 561,114, filed October 30, 1944, now abandoned, insofar as the contents of the present application have been set forth in such earlier application.

This invention relates to apparatus for automatically controlling the temperature of an electric oven to maintain the latter at a predetermined temperature, and a main object thereof is to provide a simple, rugged, compact and inexpensive device of this character for controlling the current in such a way that the oven may be heated quickly to the desired temperature, and thereafter controlling it in such a way that the oven may be maintained at that temperature by using a "slower" heat.

A further object of this invention is to provide an oven control of the class described, that is simple in action and which is readily adjusted so that it will control the temperature of the oven very closely between the desired maximum and minimum temperatures for which it is set, and the current conductors being so disposed within the device that they will always ensure the proper current paths without the danger of short circuits.

A further object of this invention is to provide a thermostatic electric oven control of the type described which is devoid of delicate or filamentary electrical connections which are liable to burn out during surges in the current, and which are adapted to conduct the current between the relatively movable parts which are adjustable by the user to operate at a predetermined temperature, or which are adjustable by the thermostat in response to temperature changes.

The control described and claimed herein is used with an oven having a main top element, a booster top element, and a bottom element. Four snap-action switches are used therein, including a Bake switch in series with the bottom element, a Grill switch in series with the top element, a Boost switch in series with the booster element, and a Main switch in series with all the elements.

With this control, all the switches are controlled by a single manually adjustable lever, and they are also actuated by a thermostatically controlled cam.

When the manually adjustable lever is adjusted to the "off" position, the circuits to all the switches are open. If the lever is set at the Grill position, the Grill, Boost and Main switches are closed, whereas the Bake switch is open, and thus the top and the booster elements only are on. If the oven becomes too hot, the Main switch is opened by means of the thermostatically controlled cam, thereby allowing the oven to cool slightly and when the oven has sufficiently cooled, the thermostatically controlled cam releases the Main switch thus allowing the oven to heat once again, and so on.

If the manually adjustable lever was originally at the "off" position, and is then set to any position other than Grill, the Grill and Boost switches will remain off, whereas the Main and Bake switches will be turned on; thus only the bottom element will heat. If the oven becomes too hot, the thermostatically controlled cam will open the Main switch, thus turning off the bottom element. When the oven has cooled sufficiently, the thermostatically controlled cam will release the Main switch and the bottom element will heat again, and so on.

If it is desired to pre-heat the oven, that is to heat the cold oven rapidly to a predetermined temperature, the manually adjustable lever is moved to the Grill position, and is immediately afterwards moved back to the position indicating the desired temperature. By this operation, the Grill, Bake and Main switches are closed, whereas the Boost switch is open. When the desired temperature is reached, the thermostatically controlled cam will open the Grill and Main switches, and when the oven has sufficiently cooled the Main switch will close once again, whereas the Grill switch will remain open. Thus the top element may be used to pre-heat the oven, and once it has attained the desired temperature the oven is kept at that temperature by the bottom element only.

The constructions are hereinafter more fully described and are illustrated in the accompanying drawings wherein like reference characters indicate like parts in the several views, and in which Figure 1 is a side elevation of one form of snap-action switch which may be used with this invention;

Figure 2 is a front elevation thereof;

Figure 3 is a rear elevation of the snap-action contact carrier forming part of the said switch;

Figure 4 is a cross-sectional view taken through the line 4—4 of Figure 3;

Figure 5 is a side elevation of a modified form of snap-action switch;

Figure 6 is a front elevation of said modified snap-action switch;

Figure 7 is a top plan view of a control constructed in accordance with this invention with the manually adjustable lever set at the "off" position;

Figure 8 is a front elevation of said control with the manually adjustable lever in the "off" position;

Figure 9 is a longitudinal cross section of the operating tube, spindle, and thermostatically actuated cam of said control;

Figure 10 is a perspective view of the adjustable thermostatically actuated cam used in said control;

Figure 14 is a top plan view of said control, with the manually adjustable lever at the Bake position showing the switches set for Preheat.

Figure 15 is a top plan view of said control, with the manually adjustable lever at Bake position, showing the switches set for normal baking;

Figure 16 is a top plan view of said control, with the manually adjustable lever at Bake position, showing the switches as set by the thermostatically actuated cam when the oven becomes too hot;

Figure 17 is a circuit diagram of an oven with said control, showing the switches at the Preheat position;

Figure 18 is a circuit diagram of an oven with said control showing the switches at the Bake position; and Figure 19 is a circuit diagram of an oven with said control showing the switches at the Grill position.

Figure 11:
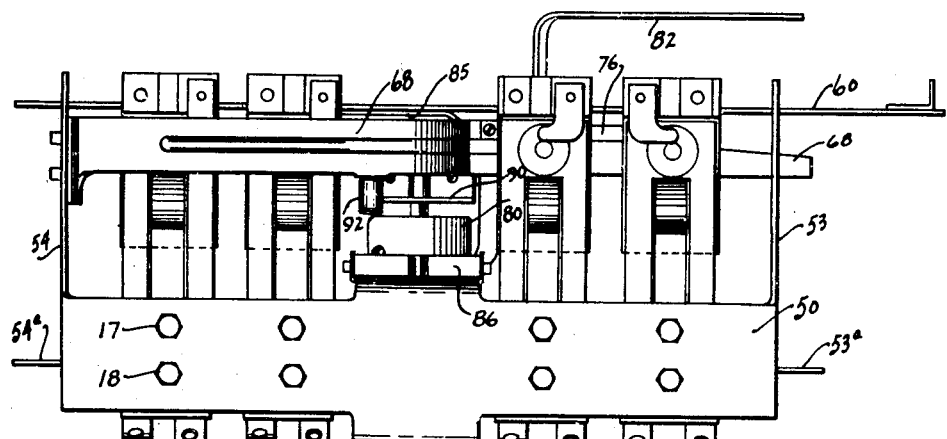
Figure 11 is a rear elevation of said control, with the manually adjustable lever at the "off" position.

Before proceeding with the description of the control, the snap-action switches which may be used therewith will first be described and reference is made particularly to Figures 1 to 6.

A resilient stop carrier 1 is secured in cantilever fashion to the insulating base 2, said base 2 being constructed of three parallel sections of rigid insulating material. In electrical contact with the resilient stop carrier 1 is a flat, rigid electrical conducting bar 3, to the lower end of which may be connected a terminal wire of an electrical circuit.

Referring to Figures 1 and 2, fixedly secured to the resilient stop carrier and spaced from the insulating base 2 is a rigid bar of insulating material 5 to which may be attached a cam follower 6. Secured to the top portion of said insulating member is a stop 7 with an adjustable set screw 8. To the upper portion of the resilient stop carrier is secured an arc-resisting contact 9. The stop carrier thus is a resilient contact finger.

The contact snap-action carrier 10 is preferably made of a thin sheet of spring material which has been split into three portions, namely a short central tongue 11, which constitutes a compression arm, and a pair of tension legs 12. These three portions are rigidly joined together at the top extremity thereof, and secured thereto opposite arc-resisting contact 9 is an arc-resisting contact 13. The contact carrier thus is a snap-action contact finger.

Figures 3 and 4 are respectively a front elevation and a cross sectional view of a contact carrier 10. It will be observed that tension legs 12 and central tongue 11 are in practice formed by a punching operation performed on the blank from which is made contact carrier 10. The legs are integral at their lower extremity, as may clearly be seen in Figure 3, and this facilitates mounting to the base. The two tension legs 12 are secured in cantilever fashion to the insulating base 2. Adjacent the tension legs 12 is a rigid, flat electrical conducting bar 14 to the lower end of which may be connected the second terminal wire of an electrical circuit.

Extending from the conducting bar 14 is a bearing member 14ª at the top extremity of which is a V-notch 15. In this V-notch 15 is pivoted the central tongue 11 of snap-action contact carrier 10. The central tongue is normally flat, but is confined to a bowed shape and is in longitudinal compression against the bearing member 14ª, the legs 12 of the contact carrier being thereby in longitudinal tension.

The tension legs 12 and the central tongue 11 of the contact carrier being respectively in tension and in compression, the contact carrier tends to asume a curved position to either side of its dead centre, depending to what side thereof it is pushed by an external force.

The three insulating sections of the base 2, the lower end of the tension legs 12 of the contact carrier 10, and the lower end of the stop carrier 1 are secured together by bolts 17 and 18, said bolts being encircled by insulating sleeves 19 and 20 in order to prevent them coming in electrical contact with the contact carrier 10 and the stop carrier 1. These bolts are also used to mount the switch to the body of the control.

If the switch has been pre-set in order that it may remain normally closed, then arc-resisting contacts 9 and 13 are normally in mechanical and electrical contact with each other. However, if an external force is applied to the back of resilient stop carrier 1, say by pushing against insulating bar 5 or cam follower 6, this force will be transmitted to snap-action contact carrier 10 and will cause it to eventually spring and snap beyond its dead centre, thus opening the electrical circuit. The contact carrier, upon being thrust beyond its dead centre will come to rest against set screw 8 of stop 7; if the external force which was applied to the resilient stop carrier is removed therefrom, the stop will pull back the contact carrier beyond its dead centre, and arc-resisting contact 13 thereof will return in electrical contact with arc-resisting contact 9 of the stop carrier.

If on the other hand, the switch has been preset so as to be normally open, arc-resisting contacts 9 and 13 are normally out of mechanical and electrical contact with each other. However, if an external force is applied to the front of resilient stop carrier 1 by pushing against stop 7, or if a force is applied to the front of contact carrier 10, the contact carrier will spring and snap beyond its dead centre, thus closing the electrical circuit. If the external force which was applied to the front of the stop carrier or to the front of the contact carrier is removed therefrom, the contact carrier will spring back beyond its dead centre, and arc-resisting contacts 9 and 13 will no longer be touching each other, and therefore the electrical circuit will be opened.

If the switch is so adjusted that the contacts thereof normally remain in the position in which they have last been set, or in other words, if the switch is so adjusted that the snap-action contact carrier 10 will normally remain on either side of its dead centre, then assuming that the switch has been closed and then a force is applied to the back of the resilient stop carrier, the switch will open and it will remain open even after said force is removed therefrom. To close the switch, a force must be applied to the front of resilient stop carrier 1 by pressing against stop 7 or to the front of contact carrier 10, and it will remain closed even after said force is removed therefrom.

The set screw 8 is provided to adjust the gap between arc-resisting contact 9 of resilient stop carrier 1 and stop 7, thereby determining the distance that the contact carrier may move to each side of its dead centre. This gap will then control the sensitivity of the switch, and the switch can therefore be adjusted in order to respond to varying amounts of external force applied to it. My switch can also be manufactured without a set screw 8 in stop 7, and in such a case the sensitivity of the switch could not be altered except by changing the physical dimensions of stop 7 or by bending said stop 7.

Although switches as hereinbefore described may satisfactorily be used with the control, nevertheless it has been found preferable to use a slightly modified type of snap-action switch as hereinafter described and as particularly shown in Figures 5 and 6, which are respectively side and front elevations thereof.

The only important difference between the modified switch and the hereinbefore described switch is in the construction of the stop and of the stop carrier. In accordance with this modified construction, there is fixedly secured to the stop carrier 1 spaced apart from the insulating base 2 an insulating plate 5ª with a flanged extremity 5ᵇ. Secured to the flanged extremity 5ᵇ is a metallic stop 7ª. The space between arc resisting contact 9 and said stop 7ª, may easily be adjusted by bending or twisting the lower end 7ᵇ of stop 7ª, and thus the operating characteristics of the switch may be varied.

Referring now to the construction of the control, a narrow back plate or casing 50 is provided with a top flange 51 and a bottom flange 52. At each end of the back plate are side flanges 53 and 54; the side flanges are of approximately the same height as the snap-switches. Wings 53ª and 54ª are provided to secure the control to the oven on which it is mounted.

Secured to the back plate 50 are four snap-switches, namely a Grill switch D, a Main switch E, a Bake switch F, and a Boost switch G. It is convenient to mount the switches to the back plate by means of bolts 17 and 18 which form part of each switch assembly. The switches used with this control are preferably of the "modified" type hereinbefore described, and shown in greater detail in Figures 5 and 6. Main switch E, Bake switch F and Boost switch G are so constructed as to remain normally closed, whereas Grill switch D will normally remain in the position in which it has last been set, that is it will remain either open or closed.

Figures 17, 18 and 19 are circuit diagrams of an oven wired to use a control constructed in accordance with this invention, with the switches shown in various positions, as will be later explained. It will be noted that the Grill switch D is connected in series with the top main element, the Bake switch F is connected in series with the bottom element, the Boost switch G is connected in series with the booster top element, and the Main switch E is connected in series with all the elements.

Journalled in suitable apertures in top flange 51 and bottom flange 52 is a hollow tube or shaft 55 inside of which is forced a ring 56 at the top extremity thereof and a similar ring 57 near the bottom extremity thereof. Journalled in rings 56 and 57 is a spindle 58. A bi-metallic thermostatic coil 59 is secured to the lower extremity of spindle 58, and the other end of the coil is secured to the end of tube 55. Thus when changes in temperature cause distortion of bi-metallic coil 59, spindle 58 will rotate to an extent proportionate to the said change in temperature.

Reciprocably mounted through suitable slots in side flanges 53 and 54 is a sliding arm 60. Secured to sliding arm 60 at the extremity thereof adjacent Grill switch D, is a rigid finger 61 adapted to engage said Grill switch so as to pull it inwardly and thereby close it, as shown in Figures 12 and 13 (Grill positions).

Figure 12:
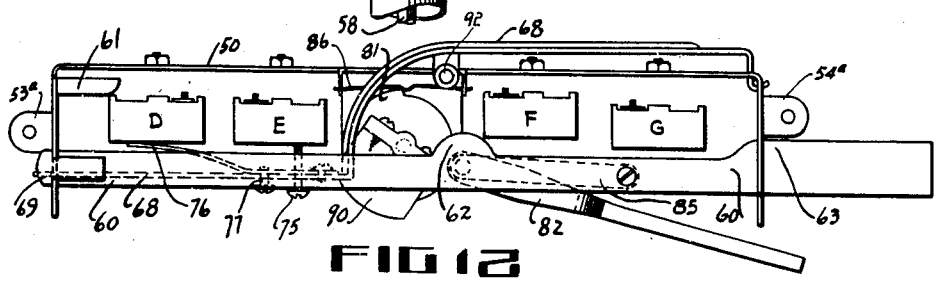
Figure 12 is a top plan view of said control, with the manually adjustable lever at the Grill position.
Figure 13:
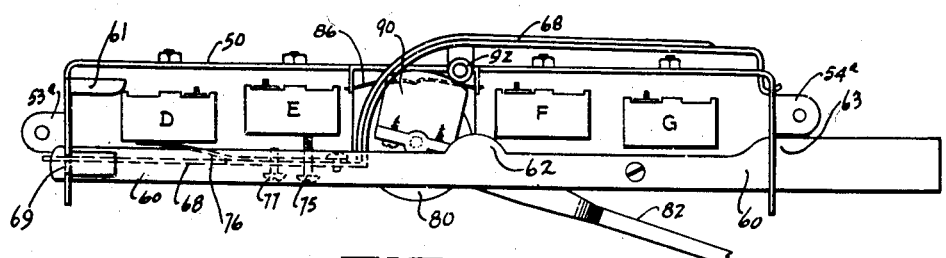
Figure 13 is a top plan view of said control, with the manually adjustable lever at the Grill position, showing the Main switch opened by the thermostatically actuated cam.

Sliding arm 60 is provided with an enlarged portion or cam 62 near the centre thereof, which is adapted to press against Bake switch F so as to open said Bake switch, as shown in Figures 12 and 13 (Grill positions). Similarly the opposite extremity of sliding arm 60 is provided with another enlarged portion or cam 63 which is adapted to bear against either Boost switch G alone as shown in Figures 14 and 16 (Preheat and Bake positions), or against both the Boost and the Bake switches as shown in Figures 7, 8 and 11 ("off" positions). It will be observed that although cam 62 is adapted to engage the main switch in certain positions and cam 63 is adapted to engage the Boost switch and/or the Bake switch in other positions, the said cams are so constructed and so positioned as to provide clearance to the switches which they are adapted to engage in order to permit the said switches to close when the said cams are shifted to other positions.

Hingedly secured by one end to flange 54 is a cam follower arm 68, the other end of said cam follower arm being loosely mounted in a slot 69 provided in flange 53. Slot 69 is considerably wider than the thickness of cam follower arm 68, and therefore the said cam follower arm may move to and fro in said slot. Screwed in cam follower arm 68 at a point opposite Main switch E is an adjustment screw 75. When cam follower 68 is at rest, screw 75 does not touch the main switch. However, if the cam follower arm is pushed outwardly, the adjustment screw will bear against the Main switch thereby forcing it outwardly and causing said switch to open.

A spring finger 76 is secured at one end to the cam follower arm, the other end thereof being loose; the spacing between the loose end of the spring finger and the cam follower arm may be adjusted by a screw 77 which is screwed in cam follower arm 68, and its tip bears against the surface of the spring finger. If sliding arm 60 is, say, in the position shown in Figure 14 (Preheat position), and cam follower arm 68 is pushed outwardly, both Grill switch D and Main switch E will be pushed outwardly by spring finger 76 and screw 75 respectively, and the switches will thereby open; the switches are then in the position shown in Fig. 16. On the other hand, if sliding arm 60 is in the position shown in Figure 12 (Grill position), the Grill switch being thereby securely closed, and cam follower arm 68 is pushed outwardly, spring finger 76 will bend thereby allowing screw 75 to press against Main switch D so as to open it, without affecting Grill switch E, as illustrated in Figure 13.

Embracing the top extremity of tube 55 is a cup-shaped member 80 to one side of which is a flange 81; to the opposite side of cup-shaped member 80 is secured manually adjustable lever 82. The bottom surface of cup-shaped member 80 is adjacent top flange 51, thus preventing downward displacement of tube 55, and a set screw 83 having a protruding head is screwed into tube 55 immediately below top flange 51 thus preventing upward displacement of tube 55. A link or connecting rod 85 joins sliding arm 60 to lever 82 which is eccentric to tube 55. Thus when manually adjustable lever 82 is radially shifted, thereby rotating tube 55, the said motion of rotation is transmitted to sliding arm 60 causing it to translate to an extent proportionate to the rotation of said tube 55.

A friction member 86 is secured to the upper surface of top flange 51, and said friction member engages flange 81 of cup-shaped member 80, thereby preventing accidental or undesired rotation of tube 55.

Secured to the top extremity of spindle 58 is a cam 90 which is formed from a stamping, as better illustrated in Figure 10; the radial position of cam 90 with respect to spindle 58 may easily be changed and adjusted by loosening screws 91; cam 90 and spindle 58 may be securely locked with respect to each other by tightening said screws 91.

A roller 92 is secured to and extends below cam follower arm 68 and the said roller is at times engaged by cam 90, thus causing the cam follower arm to move outwardly, thereby opening Grill switch D and/or Main switch E as previously described.

To set the control at the "off" position, manually adjustable lever 82 is rotated clockwise to its far-left position as shown in Figures 7, 8 and 11. In this position cam 63 of sliding arm 60 engages both the Bake and the Boost switch, thereby turning these switches off, and cam 90 secured to spindle 58 engages roller 92, thereby pushing cam follower arm 68 outwardly, which through screw 75 and leaf-spring 76 respectively forces the Grill and Main switches outwardly, thereby turning them off. Thus no current is supplied to any of the oven elements.

To set the oven so as to grill the food, manually adjustable lever 82 is rotated counter-clockwise to its far-right position, thereby turning on the Grill and the Boost element. Figure 19 is a circuit diagram of an oven with said control set at the Grill position, whereas Figure 12 is a top plan view of a control showing the manually adjustable lever at the Grill position. In this position, normally closed Boost switch G is released from cam 63 and thereby closes. Simultaneously cam 62 of sliding arm 60 engages Bake switch F pushing it outwardly and turning it off; also simultaneously rigid finger 61 pulls Grill switch D inwardly, thus turning it on. If the oven becomes too hot, bi-metallic thermostatic coil 59 causes spindle 58 to rotate, and eventually cam 90 will engage roller 92, causing cam follower arm 68 to be pushed outwardly; screw 75 secured thereto will force Main switch E outwardly, thus turning the oven off. When the oven has sufficiently cooled, cam 90 will release roller 92, and cam follower arm 68 will return to its normal position, allowing normally closed Main switch E to close once again, which will permit current to flow to the Main top element and the Booster top element once again.

If it is desired to set the control for normal baking, manually adjustable lever 82 is rotated from the "off" position to any position other than the Grill or far-right position. Figure 18 is a circuit diagram of an oven with this control showing the switches set at the Bake position, whereas Figure 15 is a top plan view of said control with the manually adjustable lever at the Bake position, showing the switches set for normal baking. In this position, normally closed Bake switch F is not engaged by either of cams 62 or 63, and therefore remains closed. Boost switch G is engaged by cam 63 and therefore is open, whereas Grill switch D which is engaged by spring 76 also remains open. Main switch E normally remains closed, but if the oven becomes too hot, bi-metallic thermostatic coil 59 will rotate spindle 58 causing cam 90 to engage roller 92 of cam follower arm 68, thereby pushing adjustment screw 75 secured thereto against Main switch E and causing said switch to open. This operation shown in Figure 16 which is a top plan view of the control with the manually adjustable lever set at the Bake position, showing the switches as set by the thermostatically actuated cam when the oven becomes too hot. With the Main switch open, there will be no current going to the oven. On the other hand, after the oven has sufficiently cooled, cam 90 will release cam follower arm 68, thereby allowing normally closed Main switch E to close once again, and thus current will again flow to the Bake element.

If the operator desires to use the oven for baking purposes, and at the same time desires the cold oven to heat rapidly, manually adjustable lever 82 is moved from the "off" position and rotated counter-clockwise to the far-right or Grill position, and immediately afterwards is moved back to the setting position for the desired temperature. This operation will set the switches as shown in Figure 17 which is a circuit diagram of an oven illustrating the switches at the pre-heat position. With this setting, the bottom and the Main top elements are both on, whereas the Booster top element is off, and as soon as the desired temperature is reached, the Main top element is turned off and will remain off whereas the bottom element will turn off and on as controlled by bi-metallic thermostatic coil 59.

As previously described regarding the setting of the control for grilling, when manually adjustable lever 82 is moved to the Grill position, the Grill, Main and Boost switches are turned on whereas the Bake switch is turned off. If immediately afterwards the handle is moved back to any other setting, cam 63 will engage the Boost switch thereby pushing it outwardly and turning it off, and cam 62 which was previously pushing the Bake switch outwardly, will release said Bake switch allowing it to return to its normally closed position. However, the Grill switch which is of the type which may remain either open or closed, or in other words will remain in the position in which it has last been set, will remain closed.

As the oven heats, thermostat coil 59 will rotate spindle 58 as previously described, and when it reaches the desired temperature it will cause cam follower arm 68 to move outwardly turning the Grill and Main switches off; there will thus be no current supplied to the oven. As soon as the oven has cooled sufficiently cam 90 will release the cam follower arm allowing the Main switch to return to its normally closed position, but the Grill switch will remain off. Thus once the oven has reached the predetermined temperature, further heat will be supplied only by the bottom element through the Main and Bake switches.

It should be pointed out that the setting of manually adjustable lever 82 will determine the temperature at which the oven will be maintained. The higher the oven temperature desired, the further to the right must manually adjustable lever 82 be set.

It is thought that the construction and use of the invention will be apparent from the above description of the various parts and their purpose. It is to be understood that the form of the invention herewith shown and described, is to be taken as a preferred example of the same and that various changes in the shape, size and arrangement of parts may be resorted to, without departing from the spirit of the invention, or the scope of the subjoined claims.

What I claim as my invention is:

1. A temperature control comprising a casing, a plurality of switches mounted on the casing, a hollow rotatable shaft journalled at one end in the casing, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the casing end of the spindle, a follower hinged at one end to the casing and adapted to bear at the other end against one of the switches, the said follower being adapted to be engaged by the cam to actuate the said switch, a sliding arm translatable in the casing and having thereon cams adapted to engage the other switch or switches, and connecting means between the hollow shaft and the sliding arm whereby rotary movement of the shaft will translate the sliding arm so that the cams thereon may actuate the said other switch or switches, the rotary movement of the hollow shaft also varying the adjustment of the spindle cam with respect to the follower so that the follower is engaged by the said spindle cam at different predetermined temperatures.

2. A temperature control comprising a casing, a plurality of switches mounted on the casing, a hollow rotatable shaft journalled at one end in the casing, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the casing end of the spindle, a follower hinged at one end to the casing and adapted to bear at the other end against one of the switches, the said follower being adapted to be engaged by the cam to actuate the said switch, a sliding arm translatable in the casing and having thereon cams adapted to engage the other switch or switches, an eccentric secured to the hollow shaft, and a connecting rod connecting the eccentric to the sliding arm whereby rotary movement of the shaft will translate the sliding arm so that the cams thereon may actuate the said other switch or switches, the rotary movement of the hollow shaft also varying the adjustment of the spindle cam with respect to the follower so that the follower is engaged by the said spindle cam at different predetermined temperatures.

3. A temperature control comprising a casing, a plurality of switches mounted on the casing, a hollow rotatable shaft journalled at one end in the casing, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the casing end of the spindle, a follower hinged at one end to the casing and adapted to bear at the other end against one of the switches, the said follower being adapted to be engaged by the cam to actuate the said switch, a sliding arm translatable in the casing and having thereon cams adapted to engage the other switch or switches, a handle secured to the hollow shaft for rotating it, and a linkage connecting the handle to the sliding arm whereby radial adjustment of the handle will translate the sliding arm so that the cams thereon may actuate the said other switch or switches, the rotary movement of the handle also varying the adjustment of the hollow shaft and consequently of the spindle cam actuated by the thermo-responsive coil so that the follower is engaged by the said spindle cam at different predetermined temperatures.

4. A temperature control comprising a plate having flanges at opposite ends, a plurality of snap action switches mounted on the plate, a bearing secured to the plate, a hollow rotatable shaft journalled at one end in the bearing, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the plate end of the spindle, a follower hinged at one end to the plate and adapted to bear at the other end against one of the switches, the said follower being adapted to be engaged by the cam to actuate the said switch, a sliding arm translatable in apertures provided in the plate flanges and having thereon cams adapted to engage the other switch or switches, and connecting means between the hollow shaft and the sliding arm whereby rotary movement of the shaft will translate the sliding arm so that the cams thereon may actuate the said other switch or switches, the rotary movement of the hollow shaft also varying the adjustment of the spindle cam with respect to the follower so that the follower is engaged by the said spindle cam at different predetermined temperatures.

5. A temperature control comprising a casing, a plurality of switches mounted on the casing, a hollow rotatable shaft journalled at one end in the casing, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the casing end of the spindle, a follower hinged at one end to the casing and adapted to bear at the other end against one of the switches, the said follower being adapted to be engaged by the cam to actuate the said switch, a sliding arm translatable in the casing and having thereon a rigid finger adapted to lock the other switch when the arm is in a certain position and to release it in other positions, a spring finger on the follower adapted when the follower is engaged by the cam to actuate the said other switch when the said other switch is not engaged by the rigid finger, the said spring finger merely flexing to permit the follower to be moved by the cam even when the said other switch is locked by the rigid finger, and connecting means between the hollow shaft and the sliding arm whereby rotary movement of the shaft will translate the sliding arm so that the rigid finger thereon may engage the said other switch, the rotary movement of the hollow shaft also varying the adjustment of the spindle cam with respect to the follower so that the follower is engaged by the said spindle cam at different predetermined temperatures.

6. A temperature control comprising a casing, a plurality of switches mounted on the casing, a hollow rotatable shaft journalled at one end in the casing, friction means on the casing engaging the rotatable shaft and tending to prevent accidental rotation thereof, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the casing end of the spindle and radially adjustable with respect to it, a follower hinged at one end to the casing and adapted to bear at the other end against one of the switches, the said follower being adapted to be engaged by the cam to actuate the said switch, a sliding arm translatable in the casing and having thereon cams adapted to engage the other switch or switches, connecting means between the hollow shaft and the sliding arm whereby rotary movement of the shaft will translate the sliding arm so that the cams thereon may actuate the said switch or switches, the rotary movement of the hollow shaft also varying the adjustment of the spindle cam with respect to the follower so that the follower is engaged by the said spindle cam at different predetermined temperatures.

7. A temperature control comprising a casing, a plurality of switches mounted on the casing, a hollow rotatable shaft journalled at one end in the casing, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the casing end of the spindle, a follower hinged at one end to the casing and adapted to bear at the other end against one of the switches, the said follower being adapted to be engaged by the cam to actuate the said switch, a sliding arm translatable in the casing and having thereon cams adapted to engage the other switch or switches, a handle secured to the hollow shaft for rotating it, a linkage connecting the handle to the sliding arm whereby radial adjustment of the handle will translate the sliding arm so that the cams thereon may actuate the said other switch or switches, the rotary movement of the handle also varying the adjustment of the hollow shaft and consequently of the spindle cam actuated by the thermo-responsive coil so that the follower is engaged by the said spindle cam at different predetermined temperatures, and means on the handle adapted to positively engage the follower so as to open the first mentioned switch when the handle is rotated to one of its extremities of travel, thereby ensuring that the switch may be opened irrespective of defects in the thermo-responsive coil.

8. A temperature control comprising a casing, a plurality of switches mounted on the casing, a hollow rotatable shaft journalled at one end in the casing, a rotatable spindle journalled in the hollow shaft, a thermo-responsive coil secured at one end to the other end of the shaft and at the other end to the spindle, the said coil being adapted to rotate the spindle relative to the hollow shaft in response to changes in temperature of the ambient, a cam secured to the casing end of the spindle, a follower hinged at one end to the casing and having adjacent the opposite end a screw adapted to bear against one of the switches, the said screw being adjustable to vary the follower pressure against the switch, the said follower being adapted to be engaged by the cam to actuate the said switch, a sliding arm translatable in the casing and having thereon cams adapted to engage the other switch or switches, and connecting means between the hollow shaft and the sliding arm whereby rotary movement of the shaft will translate the sliding arm so that the cams thereon may actuate the said other switch or switches, the rotary movement of the hollow shaft also varying the adjustment of the spindle cam with respect to the follower so that the follower is engaged by the said spindle cam at different predetermined temperatures.

ELMORE STANLEY SMITH.

REFERENCES CITED

The following references are of record in the file of this patent:

UNITED STATES PATENTS

| Number | Name | Date |
| --- | --- | --- |
| 2,041,246 | Hart | May 19, 1936 |
| 2,041,645 | Kriechbaum | May 19, 1936 |
| 2,117,514 | Shipley | May 17, 1938 |
| 2,120,937 | Kronmiller | June 14, 1938 |

FOREIGN PATENTS

| Number | Country | Date |
| --- | --- | --- |
| 722,632 | France | Jan. 4, 1932 |